Sept. 1, 1942.           D. HEYER                2,294,777
VARIABLE SPEED TRANSMISSION
Filed Aug. 4, 1939            3 Sheets-Sheet 2
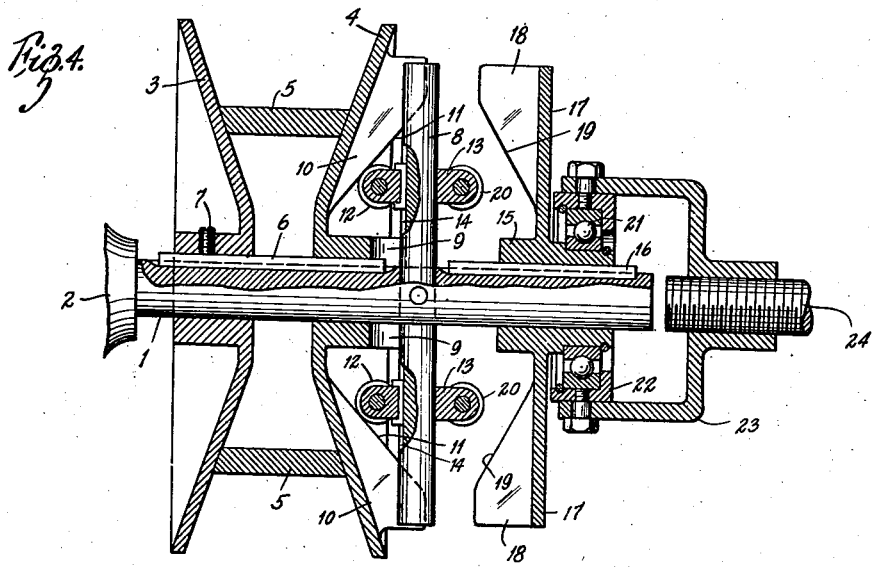
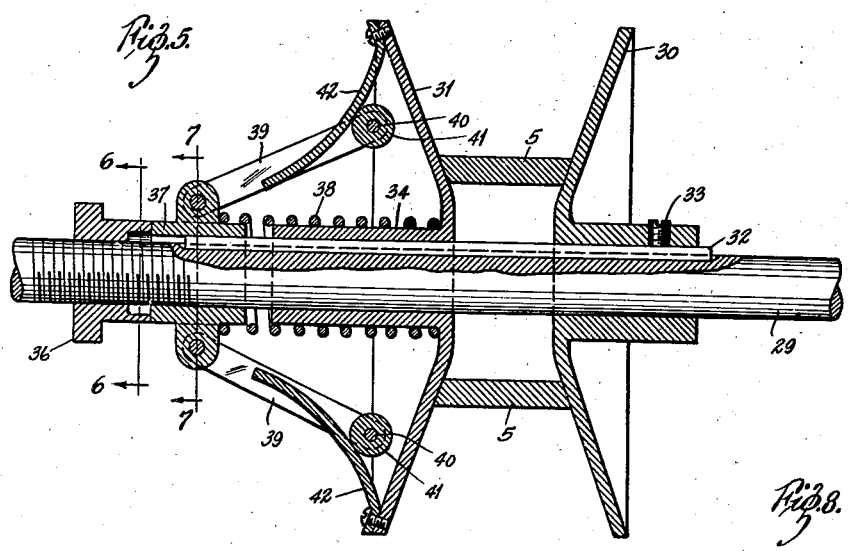
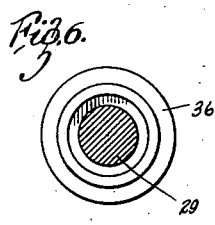
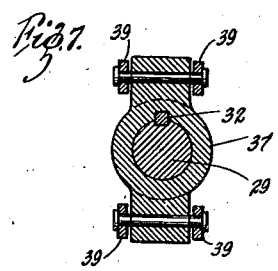
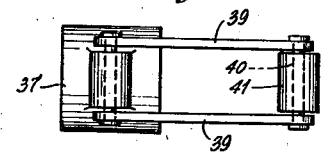
Inventor:
Don Heyer,
By John D. Rippey
His Attorney Sept. 1, 1942. D. HEYER 2,294,777
VARIABLE SPEED TRANSMISSION
Filed Aug. 4, 1939 3 Sheets-Sheet 3
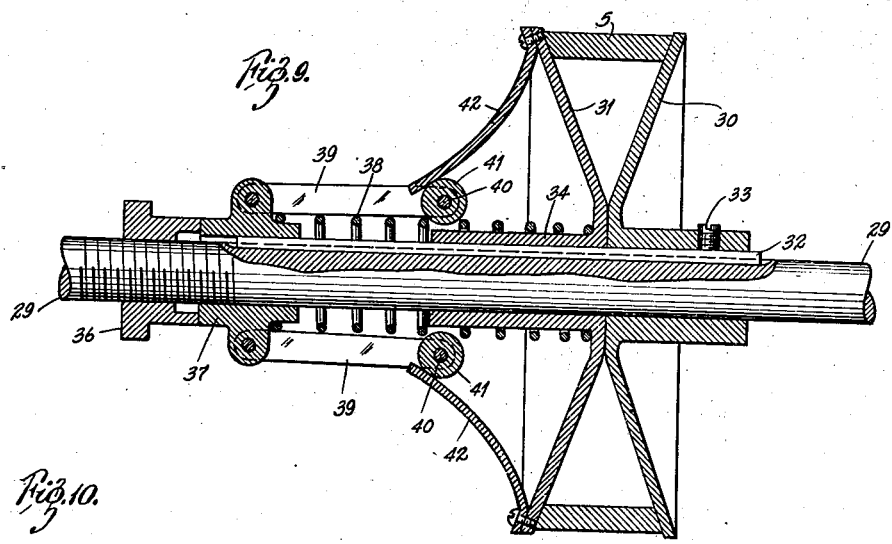
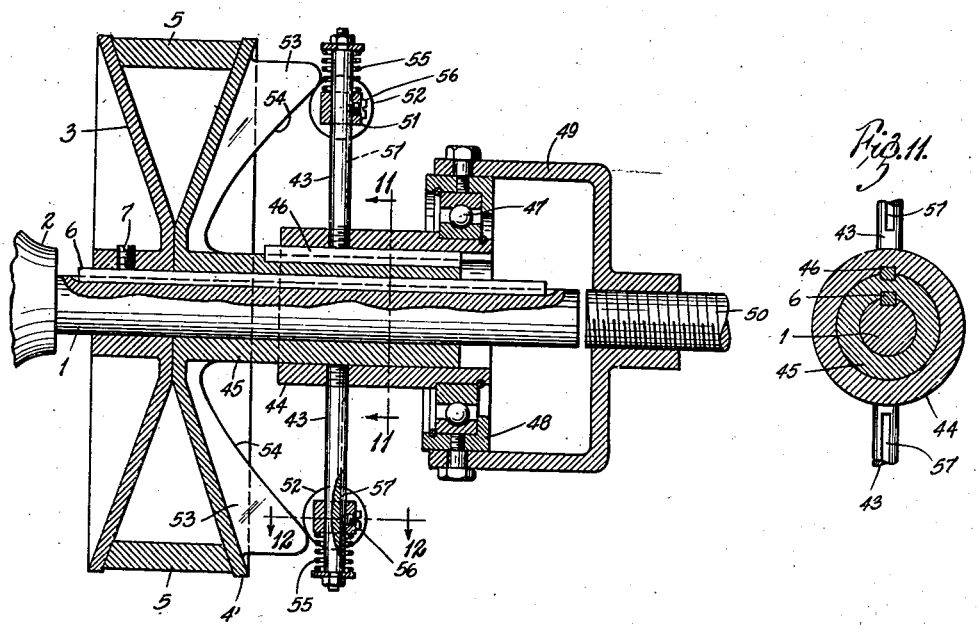
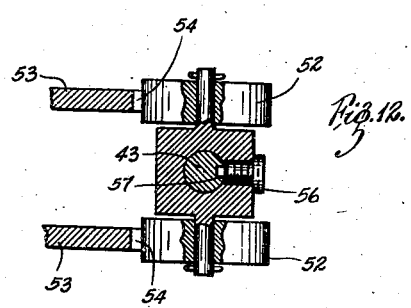
Inventor:
Don Heyer,
By John D. Rippey
His Attorney.

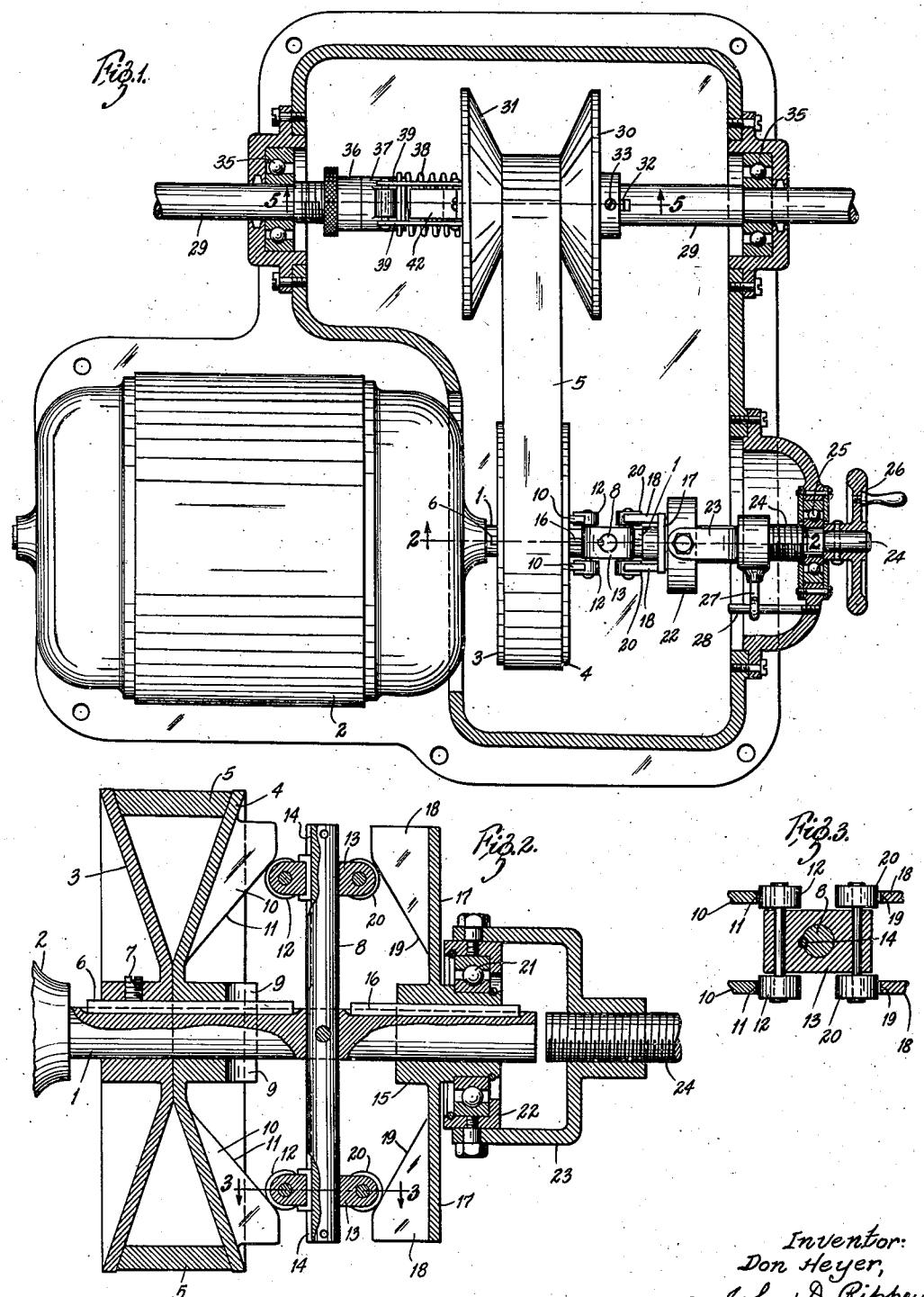

Patented Sept. 1, 1942

2,294,777

UNITED STATES PATENT OFFICE 2,294,777

VARIABLE SPEED TRANSMISSION

Don Heyer, St. Louis, Mo.

Application August 4, 1939, Serial No. 288,328

19 Claims. (Cl. 74—230.17)

This invention relates to variable speed transmission; and has special reference to a variable speed transmission device embodying centrifugally controlled pulleys for fixed center drives.

According to one embodiment of the invention, one pulley member of the driving pulley structure is adjusted by a centrifugal mechanism associated with a control device movable manually to different adjusted positions. By this arrangement, the working radius of the centrifugal elements may be optionally controlled to obtain the desired working diameter for the driving pulley. The control device may be preset or it may be adjusted during operation. In this embodiment of the invention, the driven pulley is adjustably controlled by opposed action of a spring and a centrifugal mechanism. The driving pulley and the driven pulley are mounted on parallel axes, one member of each pulley being attached to its supporting shaft and the other member of each pulley being movable axially along the supporting shaft toward and from the complementary fixed pulley member; and the adjustable pulley members of the respective pulley devices are on opposite sides of the fixed members. The centrifugal weight mechanism of the driving pulley structure exerts a force in proportion to the effective diameter of said pulley structure, and the tracks for the rollers of the centrifugal elements may be curved or straight, as desired. The arrangement is such that the driving pulley structure always assumes a minimum effective diameter when the device is idle or stopped, while the spring-actuated driven pulley member is yieldingly held at maximum diameter position, thereby automatically maintaining the belt under tension.

In another arrangement of the invention, the centrifugal device for controlling the adjustable member of the driving pulley is movable to different adjusted positions to obtain the desired effective pulley diameter. In this specifically different arrangement, the centrifugal actuators operate along radial supports which may be moved to different adjusted positions along the driving shaft on which the pulley is mounted. Thus, instead of positively limiting or restricting the effective centrifugal movement of the centrifugal device, the centrifugal device in this modified arrangement is only yieldingly limited or restricted in its effective movement. The cooperative action of the driven pulley structure may be the same in this embodiment of the invention as in the embodiment first mentioned.

An object of the invention is to provide an improved variable speed transmission mechanism having means for controlling the effective action and movement of the centrifugal devices by means that may be either preset or adjusted while the device is operating.

Other objects will be apparent from the following description, reference being made to the annexed drawings, in which—

Fig. 1 is a plan view with parts in section of an embodiment of the invention in which the effective action of the centrifugal devices controlling the driving pulley may be positively limited or restricted.

Fig. 2 is an enlarged vertical sectional view of the driving pulley and centrifugal device therefor approximately on the line 2—2 of Fig. 1, the driving pulley being adjusted at maximum diameter.

Fig. 3 is a sectional view showing the mounting of one of the centrifugal devices and the tracks therefor, on the line 3—3 of Fig. 2.

Fig. 4 is a sectional view similar to Fig. 2, showing the centrifugal devices holding the movable member of the driving pulley in a different effective position less than maximum and more than minimum diameter.

Fig. 5 is an enlarged sectional view of the driven pulley device approximately on the line 5—5 of Fig. 1, the driven pulley being at approximately minimum diameter.

Fig. 6 is a sectional view through the driven shaft and adjusting nut approximately on the line 6—6 of Fig. 5.

Fig. 7 is a sectional view on the line 7—7 of Fig. 5.

Fig. 8 is a plan view of one of the centrifugal actuators shown in Fig. 5.

Fig. 9 is a sectional view similar to Fig. 5 showing the driven pulley at maximum effective diameter, the parts being in the positions they occupy when the device is idle or stopped.

Fig. 10 is a sectional view similar to Fig. 2 showing a modification of the centrifugal device controlling the driving pulley.

Fig. 11 is a sectional view on the line 11—11 of Fig. 10.

Fig. 12 is an enlarged sectional view on the line 12—12 of Fig. 10.

The shaft 1 is rotated by the motor 2 and supports the driving pulley structure comprising two relatively adjustable pulley sections 3 and 4. The walls of said pulley sections 3 and 4 diverge from each other. These sections are relatively adjustable in order to obtain the desired effective diameter for operating the belt 5 engaged between said pulley sections. The pulley section 3 is attached to the shaft 1 by a key 6 and a set screw 7 so that said shaft 1 and said pulley section 3 are relatively immovable. However, when the set screw 7 is loosened, the pulley section 3 may be moved to different adjusted positions along the shaft 1 and then attached to said shaft.

The pulley section 4 is mounted for sliding movements along the shaft 1 toward and from the pulley section 3 and is engaged with the key 6 for rotation by said shaft. As shown in Fig. 2, the pulley sections 3 and 4 are together, thereby providing a driving pulley of maximum effective diameter. As shown in Fig. 4, the pulley section 4 is spaced from the pulley section 3, and the belt 5 is engaged with the pulley in an intermediate position between minimum effective diameter and maximum effective diameter.

A support comprising a rod 8 extends diametrically through the shaft 1 outwardly beyond the pulley section 4, the hub of which is formed with notches 9 which will receive the rod 8 when the pulley section 4 is in its outermost position. Two pairs of flanges 10 are formed integral with the outer side of the pulley section 4, and have their edges curved or otherwise shaped to provide tracks 11 for rollers 12 of centrifugal members 13 mounted for sliding movements along the rod 8 and connected thereto by splines 14. When the motor 2 is operating and the shaft 1 is rotated, the centrifugal devices 13 are impelled outwardly by centrifugal force, thereby moving the pulley section 4 toward the pulley section 3 to increase the effective diameter of the pulley. When the mechanism is idle or stopped, the tension of the belt 5 under the influence of the driven pulley actuates the pulley section 4 away from the pulley section 3, thereby moving the centrifugal devices 13 toward the shaft 1. The driving pulley is thereby caused to assume a minimum effective diameter.

The maximum effective diameter of the driving pulley may be controlled by a device provided for that purpose. In the embodiment shown in Figs. 2 and 4, a hub 15 is mounted for sliding movements along the shaft 1 and connected with said shaft by a key 16 so that said hub will be rotated with the shaft. A pair of oppositely extended radial arms 17 are formed integral with the hub 15, and each of said arms has on its inner surface a pair of flanges 18 having their edges shaped to provide tracks 19 complementary to the tracks 11 and against which the rollers 20 carried by the centrifugal devices 13 operate. It is apparent that extent of outward movement of the centrifugal devices 13 may be limited and restricted by the tracks 19. When this control device is moved to an adjusted position toward the movable pulley member 4, it is apparent that extent of outward movement of the centrifugal devices will be limited to an extent depending upon the positions of the tracks 19.

The hub 15 extends through a bearing 21 mounted in a support 22 attached to a yoke 23. A control spindle 24 is screwed into the yoke 23 in axial alinement with the shaft 1 and is supported for rotation in a bearing 25. A handle device 26 is attached to the outer end of the spindle 24 and is operative to rotate said spindle to move the yoke 23 and thereby the control device 17 to different adjusted positions. The yoke 23 may be held from rotating with the shaft 1 or with the spindle 24 by an arm 27 attached to said yoke and having an opening through which a stationary rod 28 extends (Fig. 1). By this arrangement, rotation of the spindle 24 will move the yoke 23, and thereby the control device 17, inwardly or outwardly to different adjusted positions to limit, restrict and control effective operation of the centrifugal devices 13. As a consequence, the effective diameter of the driving pulley comprising the pulley sections 3 and 4 may be automatically controlled after the control device 17 has been set. It is apparent that the control device 17 may be preset before operation of the mechanism is started, or may be set during operation of said mechanism, as desired.

The belt 5 is engaged with a driven pulley which is arranged to rotate the driven shaft 29. The driven pulley comprises complementary sections 30 and 31 the walls of which diverge. The pulley section 30 is connected with the shaft 29 by a key 32 and a set screw 33, so that said shaft and pulley section are in fixed relationship. When the set screw 33 is loosened, the pulley section 30 may be moved to different adjusted positions along the shaft 29 for rotation thereby and then attached to said shaft by the set screw 33. The hub 34 of the pulley section 31 is mounted for sliding movements along the shaft 29 toward and from the pulley section 30 to vary the effective diameter of the pulley comprising said pulley sections. Said hub 34 engages the key 32 in order to rotate the pulley section 31 in any of its positions along the shaft 29. The shaft 29 is rotatively journalled and held from longitudinal displacement by bearings 35.

A nut 36 is screwed on the shaft 29 and functions as an abutment and also as an adjusting device for a sleeve 37. The sleeve 37 is mounted for longitudinal sliding movements along the shaft 29 and is engaged with the key 32 for rotation by said shaft. A spring 38 is mounted on the hub of the pulley section 31, between said pulley section and the sleeve 37, and exerts pressure to move the pulley section 31 toward the fixed pulley section 30 to increase to the maximum the effective diameter of the pulley composed of said sections 30 and 31, as shown in Fig. 9. This is because the sleeve 37 constitutes a fixed abutment for the outer end of the spring 38 in any positions in which said sleeve is held by the adjusting abutment nut 36. When the mechanism is stopped, the spring 38 moves the pulley section 31 toward the pulley section 30 to increase to the maximum the effective diameter of the driven pulley, tension the belt 5, and reduce to minimum effective diameter the driving pulley comprising the sections 3 and 4.

Automatically and as an incident to starting of the device and to increase of speed of the driving pulley, and in accompaniment with the increase in effective diameter of the driving pulley as before described, the effective diameter of the driven pulley is decreased by centrifugal devices provided for that purpose. As shown, two pairs of arms 39 have their outer ends pivoted to the sleeve 37. The inner ends of each pair of arms are connected by rods 40. A roller 41 is mounted on each rod 40, and said rollers operate against inclined tracks 42 attached to the pulley section 31 in a relationship such that outward movement of the rollers 41 by centrifugal force will operate said rollers against and along the tracks 42 in opposition to the spring 38.

In Figs. 10, 11 and 12, a different form of centrifugal control device for controlling the effective diameter of the driving pulley is shown. In this form of the device, the fixed rod 8 is omitted and two diametrically opposite radially extended rods 43 are attached to a sleeve 44 mounted for longitudinal sliding movements on the extended hub 45 of the pulley member 4' corresponding to the pulley member 4, already described. The sleeve 44 is connected with the hub 45 by a key 46 so that the sleeve 44 will be rotated by the hub 45 of the pulley member 4', irrespective of its adjusted position along said hub. The sleeve 44 extends into a bearing 47 mounted in a support 48 attached to an adjusting yoke 49. A spindle 50 in all respects similar to the spindle 24, similarly mounted and operated, is screwed into the yoke 49. Rotation of the spindle 50 will move the yoke 49, and thereby the connected centrifugal devices, along the hub 45 of the pulley member 44 and toward and from said pulley member. A centrifugal member 51 is mounted for sliding movements along each of the rods 43, and each of said members supports a pair of rollers 52. Each pair of rollers 52 operates against a pair of flanges 53 integral with the pulley member 4' and having their edges curved or otherwise appropriately shaped to provide tracks 54 for said rollers. Springs 55 mounted on the outer ends of the rods 43 constitute yielding abutments for the centrifugal members 51. Screws 56 extending through the centrifugal members 51 engage in grooves 57 in the rods 43 to guide and prevent the centrifugal members from becoming turned or displaced. It should be apparent that the extent to which the pulley member 4' is moved toward the cooperating pulley member 3, and the consequent effective diameter of the driving pulley, may be varied and controlled by adjustment of the centrifugal device along the hub 45 of the pulley member 4'. As shown in Fig. 10, the centrifugal devices are relatively close to the pulley member 4' and will thereby move said member against or close to the pulley member 3 to provide a driving pulley of maximum effective diameter. When the centrifugal devices are adjusted farther from the pulley member 4', the latter will not be moved to its maximum effective diameter position, but will leave said member 4' in a position less than the maximum diameter position thereof.

This embodiment of the driving pulley mechanism may be used in substitution for the driving pulley mechanism first described and in cooperative relationship with the same driven pulley device. The invention may be varied in other particulars than those specifically shown and described without departure from the nature and principle thereof. I contemplate such variations as may be deemed proper in order to adapt the invention for its intended uses.

I claim:

1. In combination, an adjustable pulley structure having a pair of pulley sections with opposed inclined faces forming by relative axial adjustment variable effective pulley diameters, cam elements attached to the outer side of and diverging away from one of said pulley sections, a shaft having said pulley sections mounted thereon for relative axial adjustment to provide variable effective pulley diameters, centrifugal means mounted on said shaft and operated by rotation thereof for engaging and moving along said cam elements and thereby adjusting the axial positions of said pulley sections as aforesaid, and means settable either while said structure is at rest or while operating to control said centrifugal means and thereby limit and restrict relative adjustment of said pulley sections within a predetermined maximum of effective pulley diameter.

2. In combination, an adjustable pulley structure having a pair of pulley sections with opposed inclined faces forming by relative axial adjustment variable effective pulley diameters, cam elements attached to the outer side of and diverging away from one of said pulley sections, a shaft having said pulley sections mounted thereon for adjustments to provide variable effective pulley diameters, centrifugal means mounted on said shaft and operated during rotation thereof for engaging and moving along said cam elements and thereby controlling the effective pulley diameter provided by said sections, a device engaging and cooperating with said centrifugal means for limiting and restricting within a predetermined maximum the effective pulley diameter provided by said sections, and means for setting said device either while said structure is at rest or while operating to control said centrifugal means and thereby limit and restrict the effective pulley diameter within a predetermined maximum.

3. In combination, an adjustable pulley structure having a pair of pulley sections with opposed inclined faces forming varying effective pulley diameters according to relative axial positions of said pulley sections, a shaft having said pulley sections mounted thereon, mechanism for rotating said shaft, cam elements attached directly to and diverging away from one of said pulley sections, centrifugal means mounted on and operated by said shaft and moving along said cam elements and thereby controlling relative axial positions of said pulley sections and thereby the effective pulley diameters formed by said sections, devices limiting and restricting extent of movement of said centrifugal means and thereby controlling effective pulley diameters provided by said pulley sections, and manual means for adjusting said devices either while said mechanism is at rest or operating to limit and restrict extent of movement of said centrifugal means as aforesaid.

4. In combination, an adjustable pulley structure comprising a pair of pulley sections having opposed inclined faces forming by relative adjustment variable effective pulley diameters, centrifugal means for moving one of said pulley sections toward the other to increase the effective diameter of the pulley when the pulley is rotated, a shaft supporting said pulley sections and said centrifugal means, and a cam device adjustable along said shaft to limit movement of said centrifugal means and thereby control extent of movement of said last named pulley section by said centrifugal means.

5. In combination, an adjustable pulley structure comprising a pair of pulley sections having opposed inclined faces forming by relative axial adjustment variable effective pulley diameters, a shaft supporting said pulley sections for relative axial adjustment, centrifugal means supported and operated by said shaft for moving one of said sections toward the other, means supported by said shaft for limiting and restricting movement of said centrifugal means and thereby governing relative adjustment of said pulley sections by said centrifugal means, and mechanism driven by said pulley structure and operating when the speed of movement thereof by said pulley structure is reduced to move said one pulley section away from the other to reduce the effective diameter of the pulley provided by said sections.

6. In combination, an adjustable pulley structure comprising a pair of pulley sections having opposed inclined faces forming by relative adjustment variable effective pulley diameters, a shaft supporting said pulley sections, centrifugal means mounted on said shaft for moving one of said pulley sections relative to the other to vary the effective diameter of the pulley provided by said sections, and means supported by said shaft for moving said centrifugal means to different positions along said shaft to vary extent of movement of said pulley section thereby.

7. In combination, an adjustable pulley structure comprising a pair of pulley sections having opposed inclined faces forming by relative adjustment variable effective pulley diameters, a shaft supporting said pulley sections, centrifugal means mounted on and operated by said shaft for operating one of the said pulley sections away from the other automatically and as an incident to rotation of said shaft, and other means supported by said shaft for operating the said pulley section toward the other when said shaft and said centrifugal means are stopped.

8. In combination, an adjustable pulley structure comprising a shaft, a pair of pulley sections mounted on said shaft and having opposed inclined faces forming by relative adjustment variable effective pulley diameters, means rigidly attaching one of said pulley sections to said shaft, centrifugal means supported by said shaft for moving the other pulley section from said first pulley section to reduce the effective diameter of the pulley provided by said sections automatically and as an incident to rotation of said shaft and said sections, a device for holding said centrifugal means in different adjusted positions along said shaft relative to said pulley section operated thereby, and a spring for moving said last named pulley section toward said first named pulley section when rotation thereof is stopped.

9. In combination, an adjustable pulley structure comprising a pair of pulley sections having opposed inclined faces forming by relative adjustment variable effective pulley diameters, a shaft supporting said pulley sections, centrifugal means supported and operated by said shaft for moving one of said pulley sections relative to the other to vary the effective diameter of the pulley provided by said sections, a control device mounted on said shaft for limiting and restricting operation of said centrifugal means and thereby controlling the effective diameter of the pulley provided by said sections, and means for setting said control device either while said shaft is rotating or at rest in position to control said centrifugal means as desired.

10. In combination, an adjustable pulley structure comprising a pair of pulley sections having opposed inclined faces forming by relative axial adjustment variable effective speed diameters, spring pressure means laterally adjacent to one of said sections for effecting relative adjustment of said sections, cam elements carried by one of said pulley sections, and centrifugal means acting against said cam elements for reducing the effective pressure of said spring pressure means during rotation of said pulley sections and leaving said spring pressure means unaffected thereby when said pulley structure is stopped.

11. In combination, an adjustable pulley structure comprising two pulley sections having opposed inclined faces forming by relative axial adjustment variable effective pulley diameters, spring pressure means laterally adjacent to one of said sections for effecting relative adjustment of said sections to provide a pulley of maximum diameter, and centrifugal means acting against said one section in opposition to said spring pressure means for reducing the effective pressure of said spring pressure means according to increase in speed of rotation of said pulley structure to permit relative adjustment of said pulley sections and decrease in effective pulley diameter during rotation thereof and leaving said spring pressure means unaffected thereby when said pulley structure is stopped.

12. In combination, an adjustable pulley structure comprising two pulley sections having opposed inclined faces forming by relative axial adjustment variable effective pulley diameters, spring pressure means laterally adjacent to one of said sections for effecting relative adjustment of said pulley sections to provide a pulley of maximum effective diameter, centrifugal means operating in opposition to said spring pressure means to reduce the effective pressure of said spring pressure means during rotation of said pulley structure to permit relative adjustment of said pulley sections, reducing the effective diameter of the pulley provided thereby, and means for holding centrifugal means in different cooperative adjustments with respect to said spring pressure means and said pulley structure.

13. In combination, an adjustable pulley structure comprising a pair of pulley sections having opposed inclined faces forming by relative adjustment variable effective pulley diameters, cam elements carried by one of said pulley sections, centrifugal means engaging said cam elements for moving one of said pulley sections away from the other to vary the effective diameter of the said pulley structure when said structure is rotated, and a spring for moving one of said pulley sections toward the other in opposition to said centrifugal means when rotation of said structure is reduced to a predetermined minimum effecting variation of the diameter of the said pulley structure oppositely from the variation effected by said centrifugal means as aforesaid.

14. In combination, an adjustable pulley structure comprising a pair of pulley sections with opposed inclined faces forming by relative axial adjustment variable effective pulley diameters, one of said pulley sections having a cam portion on its outer side, a shaft having said pulley sections mounted thereon for relative axial movement to provide variable effective pulley diameters, a radial support supported and rotated by said shaft adjacent to said last named pulley section, centrifugal means mounted for radial movements along said support and operated by rotation of said shaft to engage and move along said cam portion and thereby control the relative axial positions of said pulley sections, and means for limiting and restricting relative adjustment of said pulley sections by said centrifugal means.

15. In combination, an adjustable pulley structure having a pair of pulley sections with opposed inclined faces forming varying effective pulley diameters according to relative axial positions of said pulley sections, a shaft having said pulley sections mounted thereon, mechanism for rotating said shaft, centrifugal means supported on and operated by said shaft to engage and move one of said sections and thereby control relative axial positions of said pulley sections and the effective pulley diameters formed by said sections, devices limiting and restricting extent of movement of said centrifugal means and thereby controlling effective pulley diameters provided by said pulley sections, a manually rotative spindle axially alined with said shaft and connected with said devices for adjusting said devices either while said mechanism is at rest or operating to limit and restrict extent of movement of said centrifugal means as aforesaid, and driven mechanism connected with and operated by said pulley structure for adjusting said pulley sections in relative positions to provide a pulley of minimum effective diameter when said mechanism is at rest.

16. In combination, an adjustable pulley structure having a pair of pulley sections with opposed inclined faces forming by relative axial adjustment variable effective pulley diameters, a shaft for driving said pulley sections and having said pulley sections mounted thereon for relative axial adjustment to provide variable effective pulley diameters, a rod rigidly supported by and extending radially from said shaft, centrifugal means mounted for sliding movements along said rod and operative by rotation of said shaft to control the relative axial positions of said pulley sections, and manual means coaxial with said shaft for controlling said centrifugal means and restricting relative adjustment of said pulley sections by said centrifugal means.

17. In combination, an adjustable pulley structure having a pair of pulley sections with opposed inclined faces forming varying effective pulley diameters according to relative axial positions of said pulley sections, a shaft for driving said pulley sections and having said pulley sections mounted thereon, mechanism for rotating said shaft, a rod rigidly supported by and extending radially from said shaft centrifugal means supported for sliding movements along said rod and operated by said shaft to engage and move one of said sections and thereby control relative axial positions of said pulley sections and the effective pulley diameters formed by said sections, manual control means mounted in coaxial operative relation with one of said driving pulley sections for limiting and restricting the extent of movement of said centrifugal means and thereby controlling the effective pulley diameter provided by said pulley sections either while said mechanism is at rest or operating, and driven mechanism connected with and operated by said pulley structure for adjusting said pulley sections in relative positions to provide a pulley of minimum effective diameter when said mechanism is at rest.

18. In combination, an adjustable driving pulley structure having a pair of pulley sections with opposed inclined faces forming by relative adjustment variable effective pulley diameters, a driven pulley structure also comprising a pair of pulley sections with opposed inclined faces forming by relative adjustment variable effective pulley diameters, a shaft supporting said driven pulley structure, spring pressure means mounted on said shaft engaging one of said driven pulley sections for effective relative adjustment of said driven pulley sections in response to centrifugal means operating said driving pulley sections upon rotation thereof, a support mounted on said shaft beyond one side of said driven pulley sections and centrifugal means on said support controlling the effective spring pressure in relation to change in the driven pulley diameter while said support remains stationary relative to said driven pulley sections.

19. In combination, and adjustable driving pulley structure having a pair of pulley sections with opposed inclined faces forming by relative axial adjustment variable effective speed diameters, a shaft having said pulley sections mounted thereon for relative adjustment to provide said variable effective pulley diameters, centrifugal control means mounted on said shaft and effective upon rotation thereof for adjusting the axial position of one of said pulley sections and mounted in coaxial relation thereto, a cam device adjustable away from said driving pulley structure to leave said centrifugal control means free to effect an increase in the diameter of said driving pulley structure, and manual means for presetting said cam means to a predetermined value.

DON HEYER.